Aug. 13, 1963 F. P. NORMAN Re. 25,435

LINT TYPE PARTICLE ADHESIVE REMOVAL DEVICE

Original Filed Oct. 20, 1958

INVENTOR:
Frances P. Norman
By Smyth & Loaton
Attorneys

United States Patent Office

Re. 25,435
Reissued Aug. 13, 1963

25,435
LINT TYPE PARTICLE ADHESIVE REMOVAL DEVICE

Frances P. Norman, 104 N. Virgil Ave., Los Angeles 4, Calif.

Original No. 3,029,453, dated Apr. 17, 1962, Ser. No. 768,168, Oct. 20, 1958. Application for reissue Apr. 3, 1963, Ser. No. 270,482
2 Claims. (Cl. 15—104)

Matter enclosed in heavy brackets [ ] appears in the original patent but forms no part of this reissue specification; matter printed in italics indicates the additions made by reissue.

This invention relates to adhesive contact means for removing lint, hairs and other particles from surfaces in general, and, in particular, from fabrics to which such particles may have become lightly adhered by electrostatic attraction or otherwise.

It is a well recognized fact that certain fabrics, such as those made from wools, serges and some of the synthetic fibers (e.g. nylon, Dacron), very easily pick up electrostatic charges through friction with other fabrics and in other ways, and in this charged condition these fabrics exert a strong attraction for lint, hairs and other particles.

The accumulation of such lint, hairs, dust and other particles upon a garment contributes to a soiled appearance of the latter, so that their removal is an object of dry cleaning operations, and it is often desired by the wearer of a garment between dry cleanings. Thus, garments are often brushed and treated with anti-static agents in an effort to rid them of lint, dust, etc.

In recent years there has been developed by the Minnesota Mining & Manufacturing Company of St. Paul, Minnesota, a special tacky tape which is designed for utilization in dry cleaning spotting operations to effect the removal of lint, hair and other particles which may not have been removed from the garments during the washing steps of such operations. This tape is the subject of U.S. Letters Patent No. 2,607,711, issued August 19, 1952.

Prior to the present invention, this special tacky tape has been employed on cylindrical holders which are rolled by the dry cleaning spotter over those portions of garments being spotted upon which the undesired lint, hairs, or other particles are found.

This tape may readily be used by anyone to remove lint, hairs, etc. from his or her own garments if some practical means can be provided for distributing the tape to the public; protecting the tacky coating against contacts with undesired surfaces prior to intended use; and for actually applying the tacky area of the tape to the lint, etc. covered fabric.

The average consumer, for an occasioned use of the tape, does not care to purchase the tape in expensive bulky rolls, or the professional-tape rollers for use therewith; nor does he or she want to be concerned with putting the tape on the roller and then finding a place to store the tacky tape-covered cylinder. Moreover, often the user would like to employ the tape during travel, or on other occasions when he or she is away from home and the tape-covered cylinder is not available.

The tape itself may be considered as being somewhat expensive, so that desirably, it should be reused a number of times. Yet, to enable this to be done, provision must be made for re-covering the tacky surface after each use to prevent deterioration of its adhesive character during intervals between usages, and to prevent the surface from sticking to objects with which it may come into direct contact as, for example, the contents of a woman's handbag.

Desirably, moreover, means should be provided for actually holding the tape during usage in such a way as to avoid sticky contact with the user's fingers or hand, while enabling the tape's tacky surface to be applied to the fabric.

The present invention accomplishes all of the foregoing objects in that it provides both a releasable cover for the tape, and a means for holding the tape, with its tacky face outward for its desired use. The holding means and the releasable cover may be a single element, or two separate elements.

In the preferred embodiment of the invention, the holding means is constructed by providing a flexible sheet which is secured to the tacky portions of opposite edges of the tape, and extended over such edges and behind the tape to form, with the back of the tape, a mitt pocket into which the user's hand may be inserted. The tacky area of the tape is covered by a specially treated parchment sheet which is adapted to be easily peeled from the tacky area when the latter is to be exposed for use, and laid back thereover after usage is completed.

The device, as thus constructed, may readily be made up and sold in packs. It may be carried in handbags or suitcases, and even in the pockets of garments. The tacky area is protected at all times until the device is to be used, whereupon the protective sheet may be peeled back and the tacky area is exposed for use. When such use is completed, the protective sheet may be replaced over the tacky area to re-cover the same. The device is applied to the garment for picking up lint, etc. by inserting one hand in the pocket in the manner of using a mitt.

A number of variants of this preferred construction are described and illustrated, with the preferred embodiment, in the accompanying drawings in which.

Figure 2:
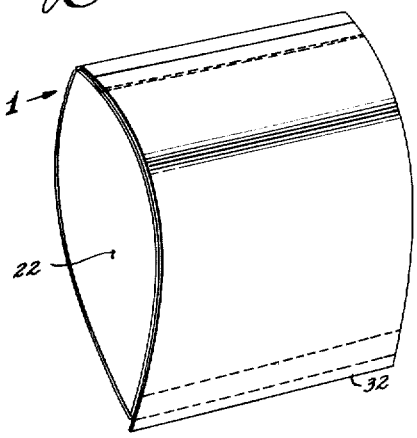
FIGURE 2 is a perspective view of the preferred embodiment of the device showing the covering element laid over the tacky coated area.

Considering first the preferred embodiment of the invention illustrated in FIGURES 1 through 4 inclusive, the device is formed about a rectangular piece of lint and particle pick-up tape 20 which is provided with the special tacky coating 21 of the character, for example, as that described in the aforesaid U.S. Patent No. 2,607,711. The reference to this last mentioned patent, however, is illustrative only, and should not be regarded as limiting applicant in the tape which may be employed in the exercise of the invention. The structure of the invention may be employed with any adhesive tape from which a covering element may be pulled without destroying its tacky character.

To enable the tacky area of this tape 20 to be placed in contact with a garment or other surface from which lint and other particles are to be picked up by such area, an open-ended mitt 22 is formed by providing a bridging flexible element 24, which may be made from paper.

This element 24 has strips of a face portion along opposite edges thereof secured to the tacky side of the opposite edges 26, 28 of the tape member 20 and extending around the back of the tape 20, said element 24 defining with the tape 20 a pocket 30 into which at least part of the user's hand may be inserted.

Figure 1:
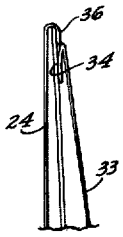
FIGURE 1 is a partial side elevation of the upper portion of the device shown in FIGURE 2, looking in the direction of the arrow 1.
Figure 3:
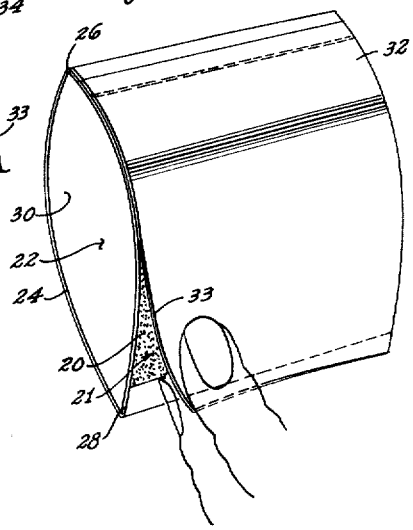
FIGURE 3 is a view similar to FIGURE 2 showing the covering element being peeled back from the tacky coated member.

The tacky area 21 is provided with a cover sheet 32 which is adhered along a narrow area 34 adjacent the edge 36 of the element 24, and folded back upon itself, as best shown in FIGURE 1, to prevent the sheet 32 from being entirely peeled off the tacky area when the portion 33 is stripped off. The cover sheet 32 should be a flexible, tough, tear-resistant type of material which presents a smooth surface with a minimum of adhesion to the tacky area 21 of the tape 20, so as to be readily releasable therefrom. Any good releasing parchment such as a silicone treated parchment would be suitable. Other materials, however, will doubtlessly be found to fulfill the foregoing specifications for the cover sheet, and, in mentioning such parchment, applicant is not intending to be limited thereto.

Figure 4:
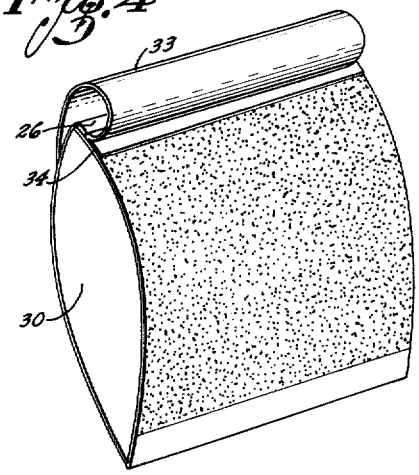
FIGURE 4 is a view similar to FIGURE 2 showing the appearance of the device after the covering element has been completely peeled off the tacky area.

The device is made up as a flat lamination of the element 24, tape 20 and cover sheet 32. When it is to be used, the cover sheet 32 is peeled off the tacky area 21 in the manner shown in FIGURE 3, and laid back over the edge 26 as shown in FIGURE 4. The user's fingers may then be inserted in the pocket 30 with the palms facing the back of the tape 20. In this disposition of the device, the user may readily apply it to selected portions of a garment or other surface to pick up the undesired lint, hairs, etc. Normally, the tacky area will not be completely covered with thus picked up particles so that the device may be used further. In this condition, the cover sheet 32 may be brought back over the edge 26 and relaid on the tacky area 21 to which it will lightly adhere sufficiently to protect the area 21 against early deterioration of the adhesive coating and against undesired contacts therewith.

Figure 5:
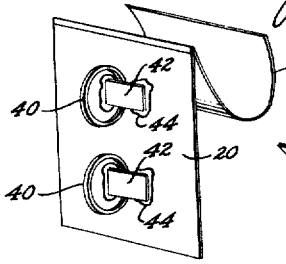
FIGURE 5 is a reduced perspective view, taken from the rear, of another embodiment of the invention.

In the embodiment of the invention illustrated in FIGURE 5, the tape holding means consists of a pair of loops 40 of string or rubber, which serve to receive two of the user's fingers. These loops 40 may be secured to the back of the tape 20 by a pair of flat elements 42 secured to the tape by adhesive 44.

Figure 6:
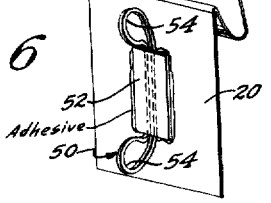
FIGURE 6 is a reduced perspective view, similarly taken from the rear, showing a still further embodiment of the invention.

In the FIGURE 6 embodiment, a single rubber band 50 is secured over its mid-section by an element 52 adhesively joined to the back of the tape 20, to leave a pair of loops 54 into which the user's fingers may be inserted.

Figure 7:
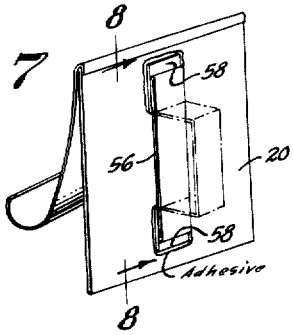
FIGURE 7 is a perspective view, also taken from the rear, of a still further embodiment of the invention.
Figure 8:
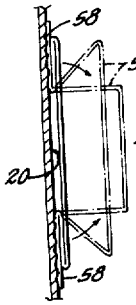
FIGURE 8 is a section taken on the line 8—8 of FIGURE 7 in the direction of the arrows.

The embodiment of FIGURES 7 and 8 provides a stiff tape-like member 56 which is secured to the back of the tape 20 at both of its extremities 58, and is folded flat against the tape 20 in the manner best shown in FIGURE 8. When unfolded as shown in the dotted-lines, the member 56 will assume the shape of a handle.

The foregoing are but a few of the many different forms which the invention may take. The most desirable form in any instance will depend upon certain various considerations, such as expense, whether the item is intended to carry advertising matter, availability of materials, etc. All such embodiments, however, are intended to be comprehended within the scope of this invention.

I claim:

*1.* A device for picking up lint, hair, dust and other small particles from a surface to which they may be lightly adhered, said device comprising: a first flexible sheet, said sheet having two sides, one side of which is coated with a tacky composition and the other side of which is tacky-free, said composition being of such character that when the said coated side is placed in contact with said surface, the said particles on the latter are transferred to the said coated side of the sheet; a second flexible sheet, strips of face portions along opposite edges of said second sheet being placed upon strips of tacky portions of opposite edges of the first flexible sheet to cause adherence thereto, said second sheet being arranged to extend over said opposite edges of the first flexible sheet and in facing abutment with the tacky-free side of said first flexible sheet, thereby to form with the first flexible sheet a pocket into which the fingers or the user's hand may be inserted; and a covering sheet, said covering sheet being placed releasably upon said tacky-coated side of the first sheet so as to be peelable therefrom, and being adapted to be so peeled therefrom without destroying the tacky character of said side of the first flexible sheet; said covering sheet being secured to the tacky side of said first flexible sheet by adhering a narrow strip adjacent one edge of said covering sheet to an exposed edge of said tacky side of said first flexible sheet, said covering sheet being doubled back over its said adhered strip and laid upon the remaining exposed area of said tacky side of said first flexible sheet, thereby to prevent said covering sheet from being completely peeled off by peeling in a direction terminating at said one adhered strip of said covering sheet.

*2. A device for picking up lint, hair, dust and other small particles from a surface to which they may be lightly adhered, said device comprising:*

*a first flexible sheet, said sheet having two sides, one side of which is coated with a tacky composition and the other side of which is tacky-free, said composition being of such character that when the said coated side is placed in contact with said surface, the said particles on the latter are transferred to the said coated side of the sheet; and*

*a covering sheet, said covering sheet being placed releasably upon said tacky-coated side of the first sheet so as to be peelable therefrom, and being adapted to be so peeled therefrom without destroying the tacky character of said side of the first flexible sheet;*

*said covering sheet being secured to the tacky side of said first flexible sheet by adhering a narrow strip adjacent one edge of said covering sheet to an exposed edge of said tacky side of said first flexible sheet, said covering sheet being doubled back over its said adhered strip and laid upon the remaining exposed area of said tacky side of said first flexible sheet, thereby to prevent said covering sheet from being completely peeled off by peeling in a direction terminating at said one adhered strip of said covering sheet.*

References Cited in the file of this patent or the original patent

UNITED STATES PATENTS

| | | |
|---|---|---|
| 1,994,425 | Weller | Mar. 12, 1935 |
| 2,528,602 | Magit | Nov. 7, 1950 |
| 2,724,847 | Krasno | Nov. 29, 1955 |
| 2,854,682 | Berezny | Oct. 7, 1958 |
| 2,913,745 | Welvang | Nov. 24, 1959 |

FOREIGN PATENTS

| | | |
|---|---|---|
| 5,345 | Great Britain | Sept. 11, 1905 |